(12) United States Patent
King et al.

(10) Patent No.: US 11,397,497 B2
(45) Date of Patent: Jul. 26, 2022

(54) SYSTEM AND METHOD FOR DETECTING TACTILE INTERACTION BASED ON SURFACE VARIATIONS OF A TACTILE INTERFACE

(71) Applicant: Knowles Electronics, LLC, Itasca, IL (US)

(72) Inventors: Charles King, Oak Park, IL (US); Jay Cech, St. Charles, IL (US)

(73) Assignee: Knowles Electonics, LLC, Itasca, IL (US)

( * ) Notice: Subject to any disclaimer, the term of this patent is extended or adjusted under 35 U.S.C. 154(b) by 0 days.

(21) Appl. No.: 16/839,247

(22) Filed: Apr. 3, 2020

(65) Prior Publication Data

US 2020/0319752 A1 Oct. 8, 2020

Related U.S. Application Data

(60) Provisional application No. 62/829,472, filed on Apr. 4, 2019.

(51) Int. Cl.
*G06F 3/044* (2006.01)
*G06F 3/041* (2006.01)

(52) U.S. Cl.
CPC .......... *G06F 3/0445* (2019.05); *G06F 3/0446* (2019.05); *G06F 3/04144* (2019.05); *G06F 3/041661* (2019.05)

(58) Field of Classification Search
CPC ............... G06F 3/0445; G06F 3/04144; G06F 3/041661; G06F 3/0446; G06F 3/04883; G06F 3/0433; G06F 3/016
See application file for complete search history.

(56) References Cited

U.S. PATENT DOCUMENTS

| | | | |
|---|---|---|---|
| 10,156,029 B1* | 12/2018 | Podhajny | D03D 1/0082 |
| 10,777,729 B2* | 9/2020 | Gdala | G06F 3/0443 |
| 2002/0101441 A1* | 8/2002 | SanGiovanni | G06F 3/04883 |
| | | | 715/702 |
| 2008/0251364 A1* | 10/2008 | Takala | H01H 13/85 |
| | | | 200/341 |
| 2010/0052879 A1* | 3/2010 | Nanos | G06F 3/04886 |
| | | | 340/407.2 |
| 2011/0003550 A1* | 1/2011 | Klinghult | G06F 1/1684 |
| | | | 455/41.3 |
| 2011/0260990 A1* | 10/2011 | Ali | G06F 3/016 |
| | | | 345/173 |
| 2012/0068835 A1* | 3/2012 | Li | G06F 3/016 |
| | | | 340/407.1 |

(Continued)

*Primary Examiner* — Ibrahim A Khan

(57) ABSTRACT

Disclosed herein are related to a touch sensitive device. The touch sensitive device includes a panel with a surface including a tactile interface, where the tactile interface has surface variations forming a tactile pattern. In one aspect, tactile interaction with the tactile pattern produces an energy signature representative of the surface variations. In one aspect, the touch sensitive device further includes an electro-mechanical transducer configured to generate an electrical output signal in response to detecting the energy signature. In one aspect, an output of the electro-mechanical transducer is connectable to a processor configured to produce a control signal based on the electrical output signal of the electro-mechanical transducer.

24 Claims, 14 Drawing Sheets

(56) References Cited

U.S. PATENT DOCUMENTS

| | | | | |
|---|---|---|---|---|
| 2012/0270605 A1* | 10/2012 | Garrone | ............. | G06F 3/03545 |
| | | | | 455/566 |
| 2013/0141378 A1* | 6/2013 | Yu | ........................... | G06F 3/016 |
| | | | | 345/173 |
| 2014/0267013 A1* | 9/2014 | Grant | ..................... | A63F 13/28 |
| | | | | 345/156 |
| 2015/0022466 A1* | 1/2015 | Levesque | ............ | G06F 3/04883 |
| | | | | 345/173 |
| 2015/0062018 A1* | 3/2015 | Naidu | .................... | G06F 3/016 |
| | | | | 345/173 |
| 2015/0145657 A1* | 5/2015 | Levesque | ................ | G06F 3/016 |
| | | | | 340/407.2 |
| 2015/0268725 A1* | 9/2015 | Levesque | ................ | G06F 3/016 |
| | | | | 345/156 |
| 2015/0293592 A1* | 10/2015 | Cheong | .................. | G06F 1/163 |
| | | | | 345/173 |
| 2016/0209979 A1* | 7/2016 | Endo | ..................... | G06F 3/0488 |
| 2018/0224926 A1* | 8/2018 | Harviainen | ............. | G06F 3/016 |
| 2018/0301140 A1* | 10/2018 | Turcott | .................. | G06F 3/016 |
| 2019/0373357 A1* | 12/2019 | Khaleghimeybodi | ...................... | |
| | | | | H04R 1/1041 |
| 2020/0004337 A1* | 1/2020 | Hendren | ............... | G06F 1/1616 |
| 2020/0092665 A1* | 3/2020 | Roeck | ................. | H04R 25/558 |

\* cited by examiner

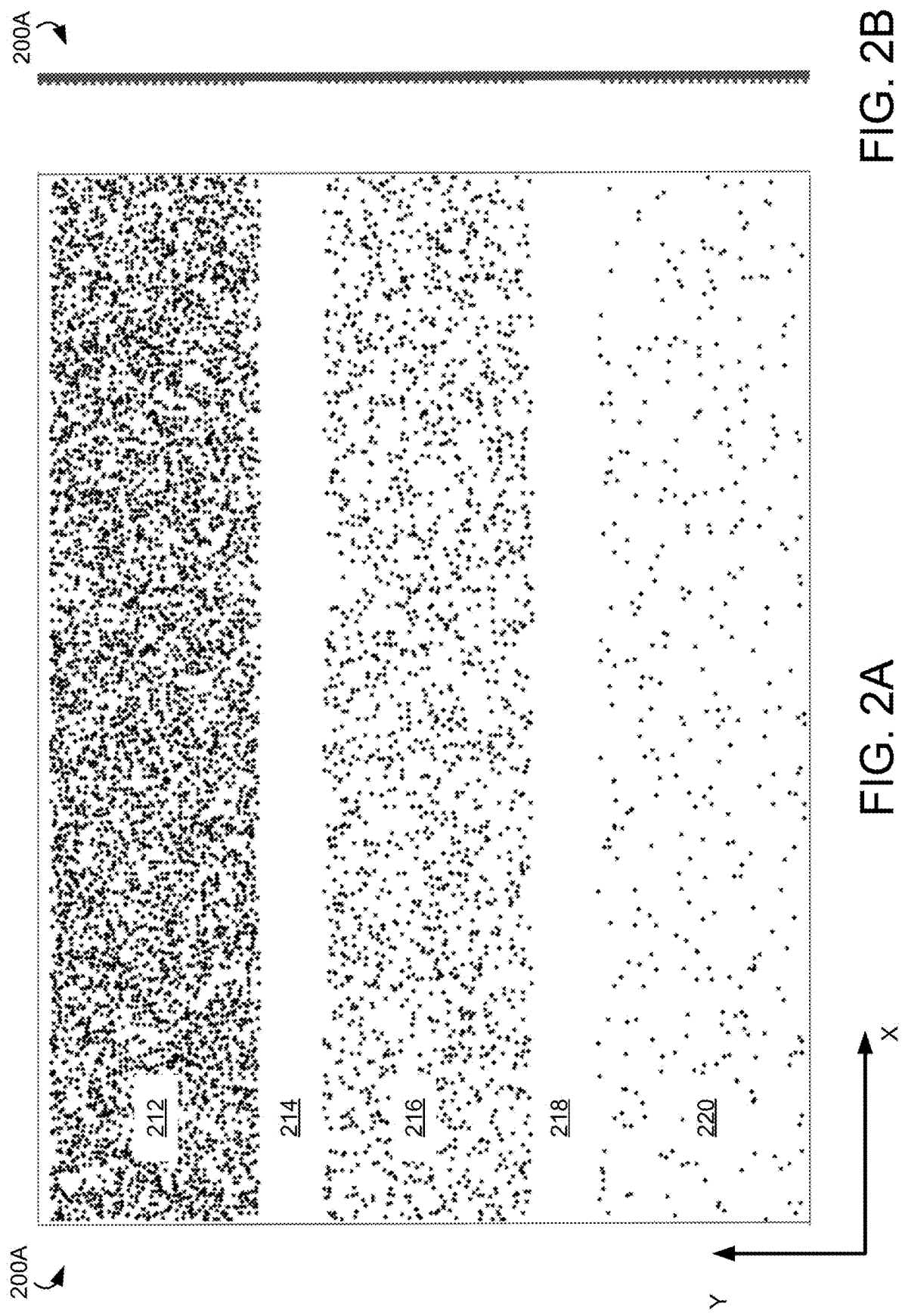

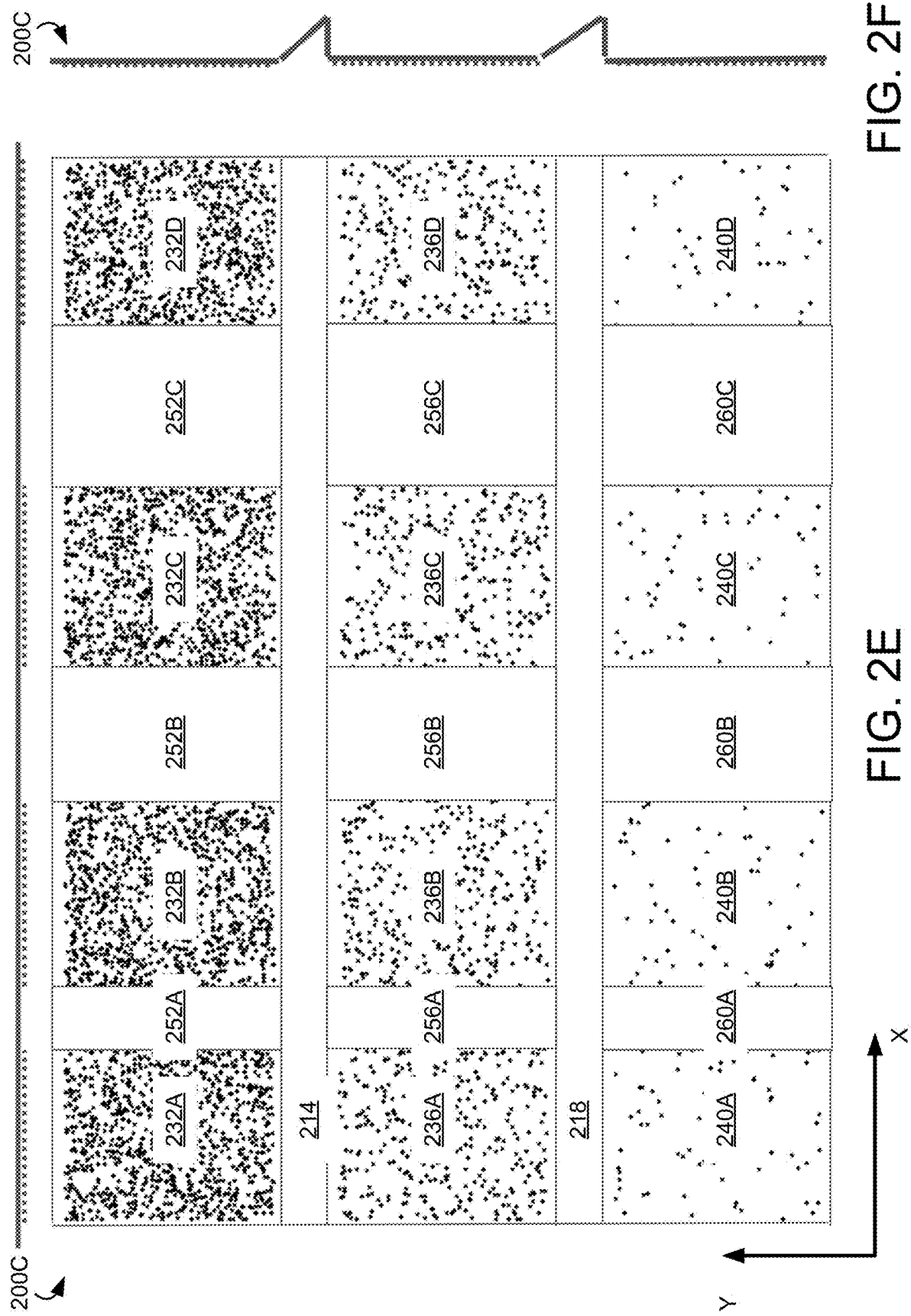

SYSTEM AND METHOD FOR DETECTING TACTILE INTERACTION BASED ON SURFACE VARIATIONS OF A TACTILE INTERFACE

RELATED APPLICATIONS

This application claims priority to U.S. Provisional Patent Application Ser. No. 62/829,472 filed on Apr. 4, 2019, entitled "System and Method for Detecting Tactile Interaction Based on Surface Variations of a Tactile Interface," the entire contents of which are hereby incorporated by reference.

BACKGROUND

Touch sensitive devices can use sensors to determine that a touch has occurred on a surface of the device. In one implementation, a touch sensitive device senses a touch on a surface based on a change in a capacitance due to the touch. However, sensing a touch based on the change in the capacitance may not be suitable for all touch sensing applications. For example, a gloved or dirty finger may render capacitive sensing inaccurate and/or inconsistent. Additionally, achieving sufficient resolution through capacitive sensing can be expensive. Capacitive sensing may also be ineffective for touch surfaces made from conductive materials, such as metal. In some cases, size, shape and placement of a device may be incompatible with other sensing technologies

SUMMARY

Various embodiments disclosed herein are related to a touch sensitive device. In some embodiments, the touch sensitive device includes a panel with a surface including a tactile interface, where the tactile interface has surface variations forming a tactile pattern. In some embodiments, tactile interaction with the tactile pattern produces an energy signature representative of the surface variations. In some embodiments, the touch sensitive device further includes an electro-mechanical transducer configured to generate an electrical output signal in response to detecting the energy signature. In some embodiments, an output of the electro-mechanical transducer is connectable to a processor configured to produce a control signal based on the electrical output signal of the electro-mechanical transducer.

Various embodiments disclosed herein are related to a controller. In some embodiments, the controller includes a processor and a non-transitory computer readable medium storing instructions, when executed by the processor, cause the processor to obtain an electrical output signal indicating an energy signature, where the energy signature is representative of surface variations of a tactile interface. In some embodiments, the non-transitory computer readable medium stores instructions, when executed by the processor, cause the processor to determine a characteristic of a tactile interaction on the tactile interface according to the electrical output signal.

BRIEF DESCRIPTION OF THE DRAWINGS

The foregoing and other features of the present disclosure will become more fully apparent from the following description and appended claims, taken in conjunction with the accompanying drawings. Understanding that these drawings depict embodiments in accordance with the disclosure and are, therefore, not to be considered limiting of its scope, the disclosure will be described with additional specificity and detail through use of the accompanying drawings.

FIG. 2A shows a top planar view of an example tactile interface in accordance with various implementations.

FIG. 2B shows a side view of the tactile interface of FIG. 2A in accordance with various implementations.

FIG. 2E shows a top planar view of an example tactile interface in accordance with various implementations.

FIG. 2F shows a side view of the tactile interface of FIG. 2E in accordance with various implementations.

Figure 1:
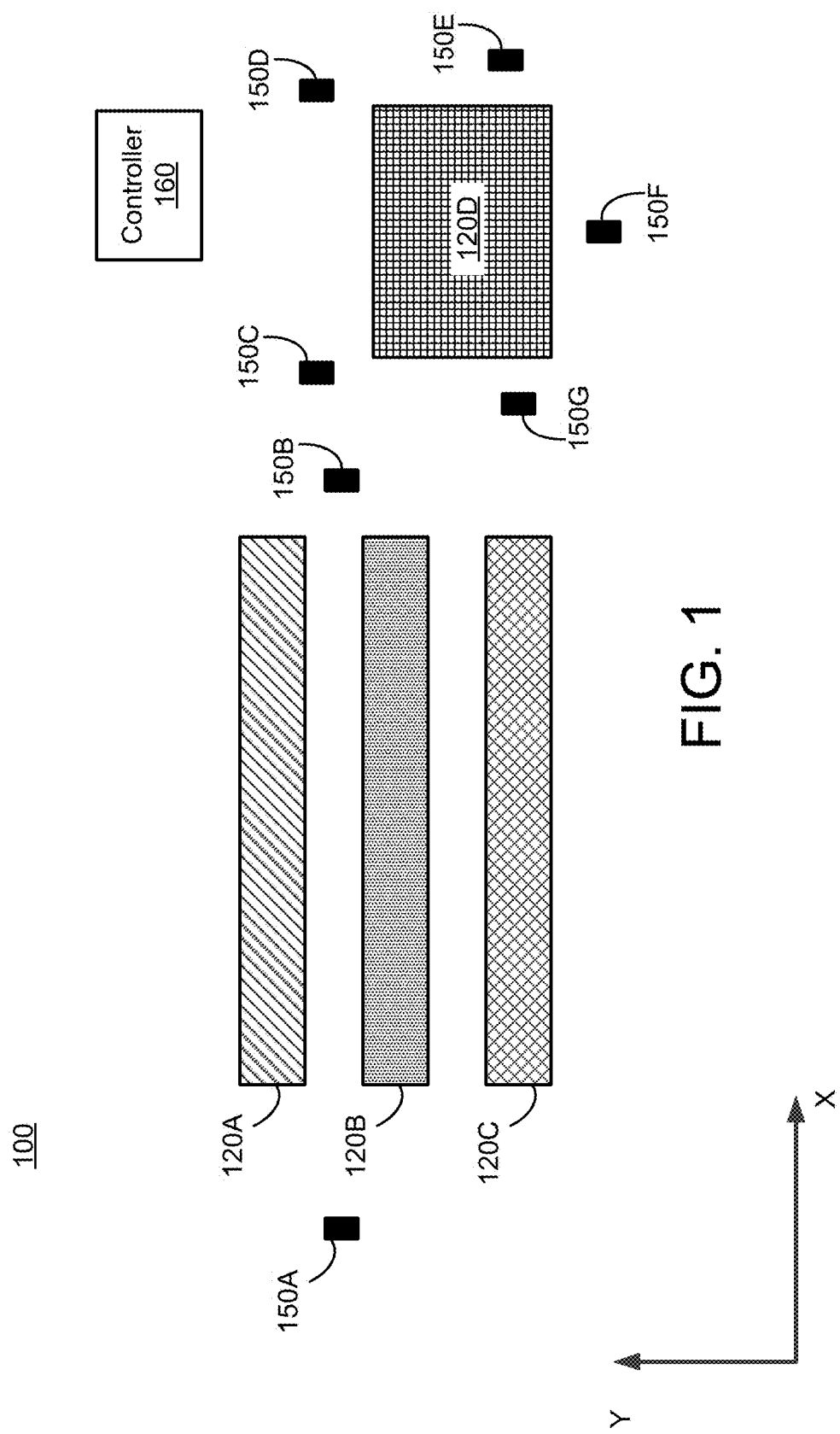
FIG. 1 shows a top planar view of an example apparatus for detecting tactile interaction on tactile interfaces based on energy signatures of the tactile interfaces in accordance with various implementations.

In the following detailed description, reference is made to the accompanying drawings, which form a part hereof. In the drawings, similar symbols identify similar components. The illustrative embodiments described in the detailed description, drawings, and claims are not meant to be limiting. Other embodiments may be used, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

Disclosures herein are related to a touch sensitive device. The touch sensitive device includes a panel with a surface including a tactile interface, where the tactile interface has surface variations forming a tactile pattern. In one aspect, tactile interaction with the tactile pattern produces an energy signature related to the surface variations. In some embodiments, an energy signature is an acoustic vibration or a mechanical vibration generated by a tactile interaction applied on a tactile pattern of a touch interface. In one aspect, the touch sensitive device further includes an electro-mechanical transducer configured to generate an electrical output signal in response to detecting the energy signature. In one aspect, an output of the electro-mechanical transducer is connectable to a processor configured to produce a control signal based on the electrical output signal of the electro-mechanical transducer.

Advantageously, the disclosed touch sensitive device allows for accurate detection of tactile interaction by generating a distinctive energy signature picked up by one or more transducers. The technique can be applied to a variety of surfaces as diverse as conductive metal or non-conductive plastic. Different energy signatures can be created by interaction with fingertip, finger nail, stylus, etc. Because physical variation is present in the surface, both user and algorithm can be trained to improve performance In one aspect, detection of tactile interaction based on distinctive energy signature allows savings in implementation costs. In one approach, rather than implementing multiple electro-mechanical transducers for corresponding tactile interfaces, a single or a fewer number of electro-mechanical transducers may be implemented, because an electro-mechanical transducer can detect and distinguish different energy signatures. .

FIG. 1 shows a top planar view of an example apparatus 100 (also referred to as "a touch sensitive device 100" herein) for detecting tactile interaction on tactile interfaces 120A-120D based on energy signatures of the tactile interfaces 120A-120D, in accordance with various implementations. In FIG. 1, the apparatus 100 includes tactile interfaces 120A-120D (generally referred to as "a tactile interface 120" herein), electro-mechanical transducers 150A-150G (generally referred to as "an electro-mechanical transducer 150" herein), and a controller 160. For example, the tactile interfaces 120A-120C are disposed on different rows, and the tactile interface 120D is disposed adjacent to a side of the tactile interface 120C. One or more of the tactile interfaces 120A-120D, the electro-mechanical transducers 150A-150G, and the controller 160 may be disposed on a same surface or different surfaces of a panel or a substrate. The surface including the tactile interfaces 120 may be planar or non-planar. The surface may be composed of molded plastic, fabricated metal or any material. The controller 160 is electrically coupled to the electro-mechanical transducers 150A-150G through conductive wires or traces. The controller 160 may receive, from the electro-mechanical transducers 150, an electrical output signal electrically representing an energy signature detected by the electro-mechanical transducers 150, and determine a tactile interaction (e.g., swipe gesture, a touch or a tap) applied on the apparatus 100 based on the electrical output signal.

In some embodiments, the apparatus 100 is integrated in a housing or display interface of a portable electronic device, cell phone, earbud, hearing aid, etc. In some embodiments, the apparatus 100 is integrated in a fixed device such as a durable goods appliance. In some embodiments, the apparatus 100 is integrated in an automobile. In some embodiments, the apparatus 100 is integrated in household electronics, television, computer monitor, mouse, etc.

In some embodiments, each tactile interface 120 has a surface variation forming a corresponding tactile pattern. The surface variation may be a variation in roughness of a surface of the panel or the substrate. The roughness may vary across the tactile interface. In one aspect, the tactile pattern is characterized by changes in the surface variations. In one implementation, the tactile pattern includes an N by M array of discrete elements, where M<N and the first tactile pattern is formed by M elements of the array and the second tactile pattern is formed by N elements of the array. The discrete elements may be defined by boundaries between areas of different roughness. The discrete elements may be defined by boundaries between areas of different height substantially normal to the array. In one aspect, tactile interaction (e.g., a contact, a swipe gesture, etc.) with a tactile pattern produces an energy signature representative of a surface variation. An energy signature may be related to a surface variation by a vibration of a corresponding tactile interface 120. In one example, a tactile interface 120 vibrates in response to the tactile interaction. In one implementation, characteristics (e.g., a pitch, spectral content, etc.) of vibrations may change depending on a direction, speed, and contact pressure of a swipe gesture applied on a tactile interface 120. A vibration from a tactile interface 120 may propagate through an air medium or through a mechanical structure such as a substrate or a panel of the apparatus 100.

An electro-mechanical transducer 150 is a component that detects vibrations or energy signatures from the tactile interfaces 120, and generates an electrical output signal. In some embodiments, the electro-mechanical transducer 150 is implemented by micro-electro-mechanical systems (MEMS) accelerometers. In another example, the electro-mechanical transducer 150 can be one or more MEMS microphones. In another example, the electro-mechanical transducer 150 can be a combination of MEMS microphones and accelerometers. In these and other examples, the MEMS microphones can comprise unplugged MEMS microphones, plugged MEMS microphones or MEMS microphones with no ports. An electrical output signal of the electro-mechanical transducer 150 electrically represents characteristics of the detected vibration. For example, an electrical output signal indicates a frequency band and amplitude or pitch of a detected vibration, and timing information (e.g., start time, duration, etc.) of energy in the frequency band. The electrical output signal may indicate characteristics of the detected vibration by a corresponding voltage, current, pulse width, pulse density, etc. The electro-mechanical transducer 150 provides the electrical output signal to the controller 160. Although multiple electro-mechanical transducers 150 are shown in FIG. 1, a different number of electro-mechanical transducers 150 (e.g., a single or multiple number) may be implemented.

The controller 160 receives the electrical output signals from the electro-mechanical transducers 150, and detects a tactile interaction applied on the apparatus 100. The controller 160 may determine a direction of a swipe (e.g., horizontal, vertical, diagonal, or any direction) according to the electrical output signals. A tactile interface 120 may generate different energy signatures, in response to swipe gestures applied in different directions. In response to a swipe gesture applied in a particular direction, a tactile interface 120 may generate an energy signature having a varying pitch of vibrations, a varying spectral content of vibrations, a varying time periods between vibrations, or any combination of them. For example, a tactile interface 120 is configured to vibrate with an increasing spectral content where the peak amplitude is increasing with frequency in response to a swipe gesture applied along an X direction. For another example, tactile interfaces 120C, 120B, 120A are configured to sequentially vibrate with corresponding different spectral content with a pause or silence between different vibrations, in response to a swipe gesture applied along a Y direction through the tactile interfaces 120C, 120B, 120A. For example, when the swipe gesture is applied on the tactile interface 120C, the tactile interface 120C vibrates with a first spectral content having a peak around a first frequency during a first time period. When the swipe gesture is applied to an area between tactile interfaces 120B and 120C during a second time period after the first time period, the vibration may be ceased or paused. When the swipe gesture is applied on the tactile interface 120B, the tactile interface 120B may vibrate with a second spectral content having a peak around a second higher frequency during a third time period after the second time period. Hence, the controller 160 may determine a swipe gesture along the Y direction according to a sequence of vibrations detected. The controller 160 may determine a direction of the swipe applied on a tactile interface 120 by detecting any change in the pitch of vibrations, spectral content, of vibrations, varying time periods between vibrations, a sequence of changes, or any combination of them based on the electrical output signal 655. Detailed description of tactile interfaces 120 and an operation of the controller 160 detecting tactile interactions applied on the tactile interfaces 120 are provided below with respect to FIGS. 2A-2H, and 3-7.

FIG. 2A shows a top planar view of an example tactile interface 200A in accordance with various implementations. FIG. 2B shows a side view of the tactile interface 200A of FIG. 2A in accordance with various implementations. The tactile interface 200A may be any of the tactile interface 120 of FIG. 1. In some embodiments, the tactile interface 200A includes elements 212, 216, 220 with different surface roughness. Each element may have protruding members or indents that are randomly or regularly dispersed with different densities. For example, the element 212 has a higher density of protruding members than the element 216, thus has a higher roughness than the element 216. The element 216 has a higher density of protruding members than the element 220, thus has a higher roughness than the element 220. In one aspect, elements 212, 216, 220 are separated or defined by boundaries 214, 218. The boundary 214 between the element 212 and the element 216 may have a smooth surface. Similarly, the boundary 218 between the element 216 and the element 220 may have a smooth surface.

In one approach, a swipe gesture applied in a Y direction traversing the elements 220, 216, 212 in that sequence causes the tactile interface 200A to generate an energy signature that is unique to the swipe gesture applied in that direction. For example, during a first time period, a tactile interaction on the element 220 causes the element 220 of the tactile interface 200A to vibrate around a first set of frequencies. Subsequently, during a second time period, a tactile interaction on the boundary 218 causes the vibration to be paused or ceased. Subsequently, during a third time period, a tactile interaction on the element 216 causes the element 216 of the tactile interface 200A to vibrate around a second higher set of frequencies. Subsequently, during a fourth time period, a tactile interaction on the boundary 214 causes the vibration to be paused or ceased. Subsequently, during a fifth time period, a tactile interaction on the element 212 causes the element 212 of the tactile interface 200A to vibrate around a third higher set of frequencies. Hence, by detecting a pattern of a vibration around a first low set of frequencies during the first time period, no vibration during the second time period, a vibration around a second higher set of frequencies during the third time period, no vibration during the fourth time period, and a vibration around a third higher set of frequencies during the fifth time period in that sequence, the controller 160 may determine that a swipe gesture was applied along the Y direction.

In one approach, the controller 160 detects relative changes of vibrations for detecting a tactile interaction. For example, the controller 160 detects a pattern of continuously increasing or decreasing frequency of vibrations, in response to a tactile interaction. For example, the controller 160 detects a pattern of continuously increasing or decreasing time periods between vibrations, in response to a tactile interaction. Advantageously, detecting a tactile interaction based on relative changes in pitches, or relative changes in frequencies of vibrations enables flexibility in detecting tactile interaction compared to detecting a tactile interaction based on particular ranges of pitches, or frequencies of vibrations, because pitches or frequency of vibrations may change depending on a material (e.g., stylus pen, or a finger) in contact with the tactile interface, and a speed or an amount of pressure applied. By detecting a tactile interaction based on relative changes of vibrations, a swipe gesture may be detected despite of variations in speed or an amount of force applied, or different materials used for tactile interaction.

Figures 2C, 2D:
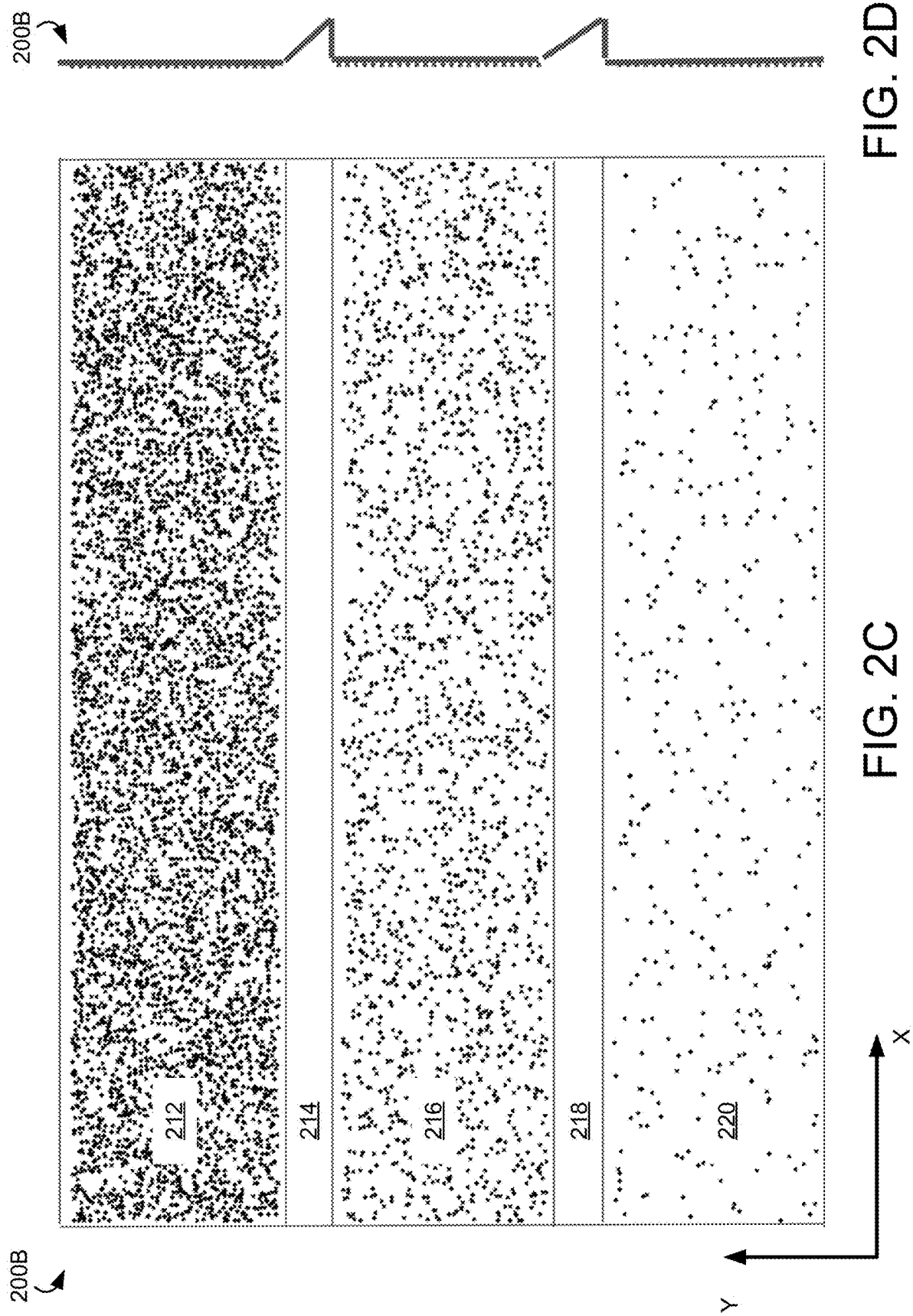
FIG. 2C shows a top planar view of an example tactile interface in accordance with various implementations.
FIG. 2D shows a side view of the tactile interface of FIG. 2C in accordance with various implementations.

FIG. 2C shows a top planar view of an example tactile interface 200B in accordance with various implementations. FIG. 2D shows a side view of the tactile interface 200B of FIG. 2C in accordance with various implementations. The tactile interface 200B may be any of the tactile interface 120 of FIG. 1. The tactile interface 200B is similar to the tactile interface 200A of FIGS. 2A, 2B except the tactile interface 200B has indents in the boundaries 214, 218. In one aspect, the indent of the boundary 214 is non-symmetric such that an edge of the indent of the boundary 214 abutting the edge of the element 216 is deeper than an edge of the indent of the boundary 214 abutting the edge of the element 212. Similarly, the indent of the boundary 218 is non-symmetric such that an edge of the indent of the boundary 218 abutting the edge of the element 220 is deeper than an edge of the indent of the boundary 218 abutting the edge of the element 216. By implementing non-symmetric indents at boundaries 214, 218 as shown in FIG. 2B, tactile interactions on the boundaries 214, 218 generate energy signatures (e.g., vibrations) unique to the boundaries 214 and 218. For example, tactile interaction (or swipe gesture) over the boundaries 214, 218 increases a frequency of the vibration as the tactile interaction progresses along the Y direction.

FIG. 2E shows a top planar view of an example tactile interface 200C in accordance with various implementations. FIG. 2F shows a side view of the tactile interface 200C of FIG. 2E in accordance with various implementations. The tactile interface 200C may be any of the tactile interface 120 of FIG. 1. The tactile interface 200C is similar to the tactile interface 200B of FIGS. 2C, 2D except the tactile interface 200C includes a 3 by 4 array of discrete elements 232A-232D, 236A-236D, 240A-240D, where the first tactile pattern is formed by 3 elements of the array in the Y direction and the second tactile pattern is formed by 4 elements of the array in the X direction. In one aspect, the elements 232A, 232B are separated or defined by a boundary 252A, the elements 232B, 232C are separated or defined by a boundary 252B; and the elements 232C, 232D are separated or defined by a boundary 252C. Similarly, the elements 236A, 236B are separated or defined by a boundary 256A, the elements 236B, 236C are separated or defined by a boundary 256B; and the elements 236C, 236D are separated or defined by a boundary 256C. Similarly, the elements 240A, 240B are separated or defined by a boundary 260A, the elements 240B, 240C are separated or defined by a boundary 260B; and the elements 240C, 240D are separated or defined by a boundary 260C. The boundaries 252A-252C, 256A-256C, 260A-260C may have a planar surface with no indents, but boundaries 214, 218 may have indents. In one aspect, the widths of the boundaries 252A, 252B, 252C increase along the X direction. Accordingly, the tactile interface 200C allows detection of a swipe gesture in any two dimensional directions. For example, a time duration of a pause between vibrations increases, according to a swipe gestures applied in the X direction, because the widths of the boundaries 252A, 252B, 252C increase along the X direction. Hence, the controller 160 may detect a swipe gesture applied in the X direction, by detecting an increase in time duration of pause between vibrations. For another example, a frequency of vibration increases, according to a swipe gestures applied in the Y direction. Hence, the controller 160 may detect a swipe gesture applied in the Y direction, by detecting an increase in the frequency of vibrations. In the examples above, the controller 160 may detect a swipe gesture applied in the XY direction, by detecting both an increase in time duration of pause between vibrations and an increase in the frequency of vibrations.

Figure 2G:
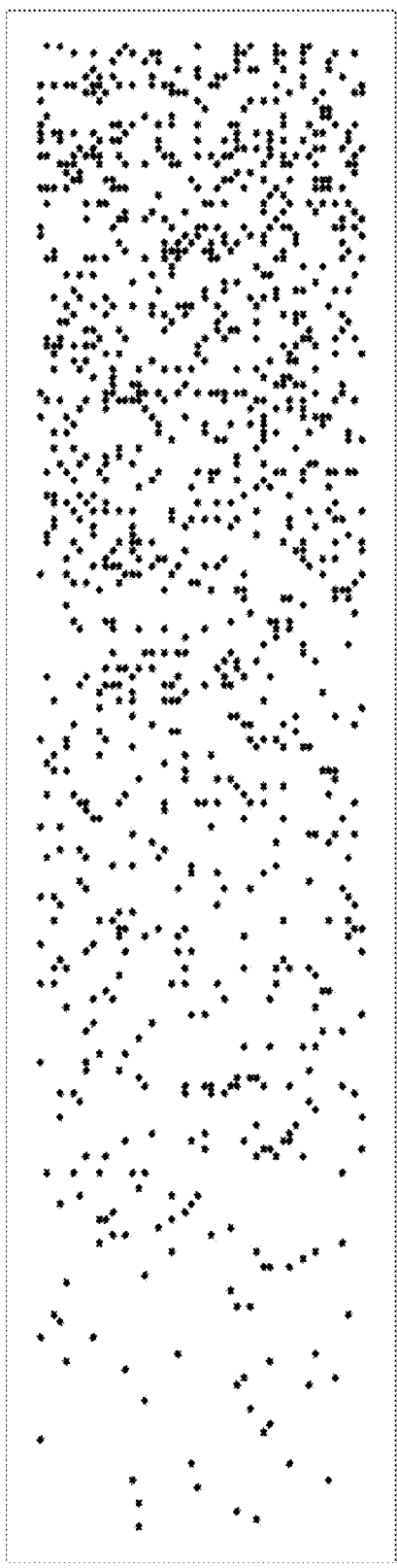
FIG. 2G shows a top planar view of an example tactile interface in accordance with various implementations.

FIG. 2G shows a top planar view of an example tactile interface 200D in accordance with various implementations. The tactile interface 200D may be any of the tactile interface 120 of FIG. 1. In FIG. 2G, a roughness of a surface of the tactile interface 120 gradually increases along the X direction. Hence, when a swipe gesture is applied along the X direction, a frequency of vibration may gradually increase. Similarly, when a swipe gesture is applied along an opposite direction to the X direction, a frequency of vibration may gradually decrease. In one approach, the controller 160 detects relative changes of vibrations (e.g., pitch or frequency) for detecting a tactile interaction. For example, the controller 160 detects a gradual increase in the frequency of vibration in response to a tactile interaction, and determines that a swipe gesture along the X direction is applied. For another example, the controller 160 detects a gradual decrease in the frequency of vibration in response to a tactile interaction, and determines that a swipe gesture along the opposite direction to the X direction is applied.

Figure 2H:
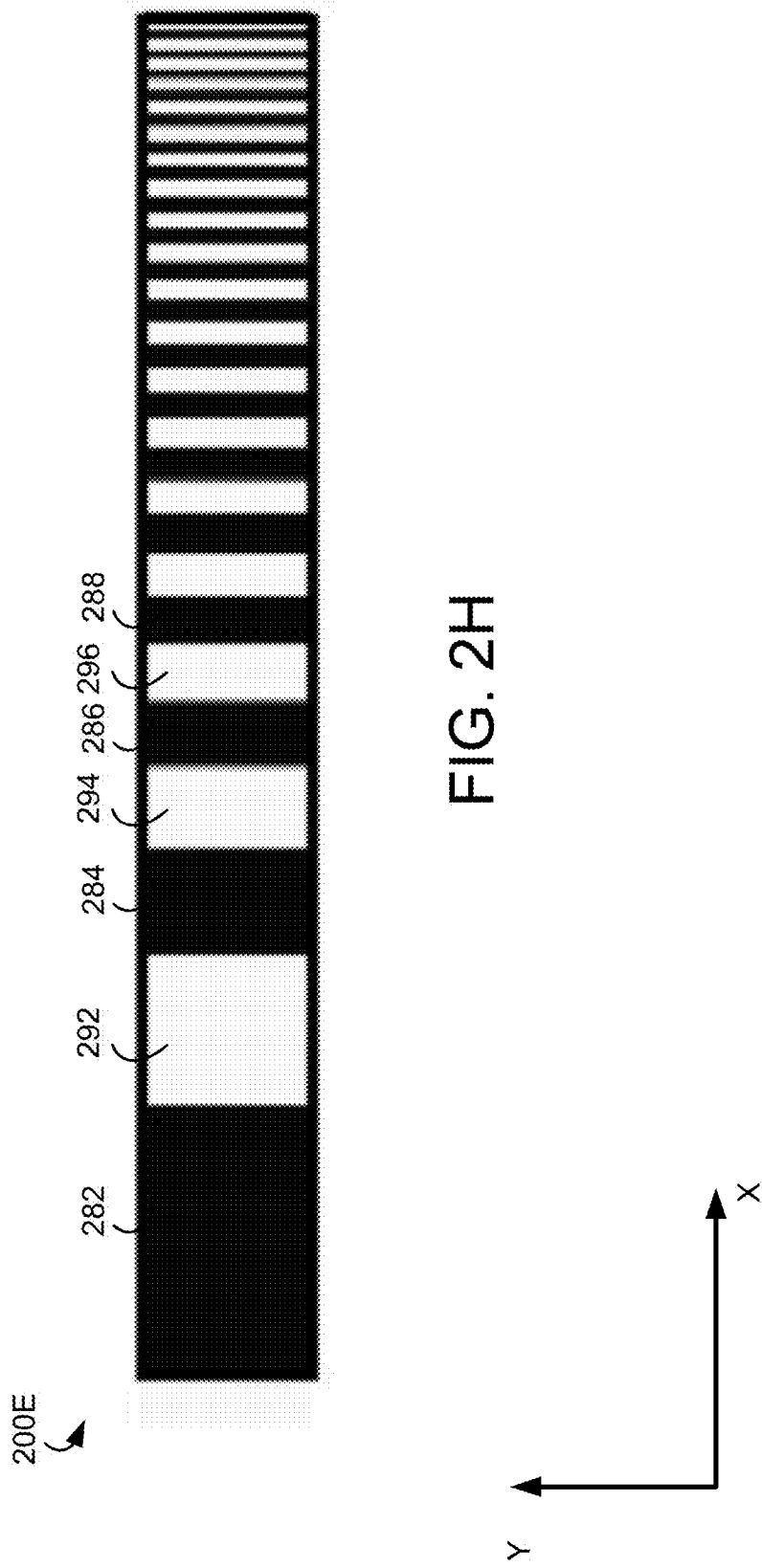
FIG. 2H shows a top planar view of an example tactile interface in accordance with various implementations.

FIG. 2H shows a top planar view of an example tactile interface 200E in accordance with various implementations. The tactile interface 200E may be any of the tactile interface 120 of FIG. 1. The tactile interface 200E includes elements 282, 284, 286, 288 that are separated and defined by boundaries 292, 294, 296. In one aspect, widths of the elements 282, 284, 286, 288 along the X direction are gradually decreased, and widths of the boundaries 292, 294, 296 along the X direction are gradually decreased. In this configuration, a swipe gesture applied on the tactile interface 200E along the X direction causes a decreasing time period between different vibrations. Similarly, a swipe gesture applied on the tactile interface 200E along the opposite direction to the X direction causes an increasing time period between different vibrations. In one approach, the controller 160 detects the relative changes in time periods between vibrations for detecting a tactile interaction. For example, the controller 160 detects a decrease in the time periods between vibrations in response to a tactile interaction, and determines that a swipe gesture along the X direction is applied. For another example, the controller 160 detects an increase in time periods between vibrations in response to a tactile interaction, and determines that a swipe gesture along the opposite direction to the X direction is applied.

Although various example of tactile interfaces 200 are shown in FIGS. 2A-2H, the scope of the disclosure is not limited to these examples. In some embodiments, other tactile interfaces 200 may be formed by modifying or combining tactile interfaces 200 shown in FIGS. 2A-2H.

Figure 3:
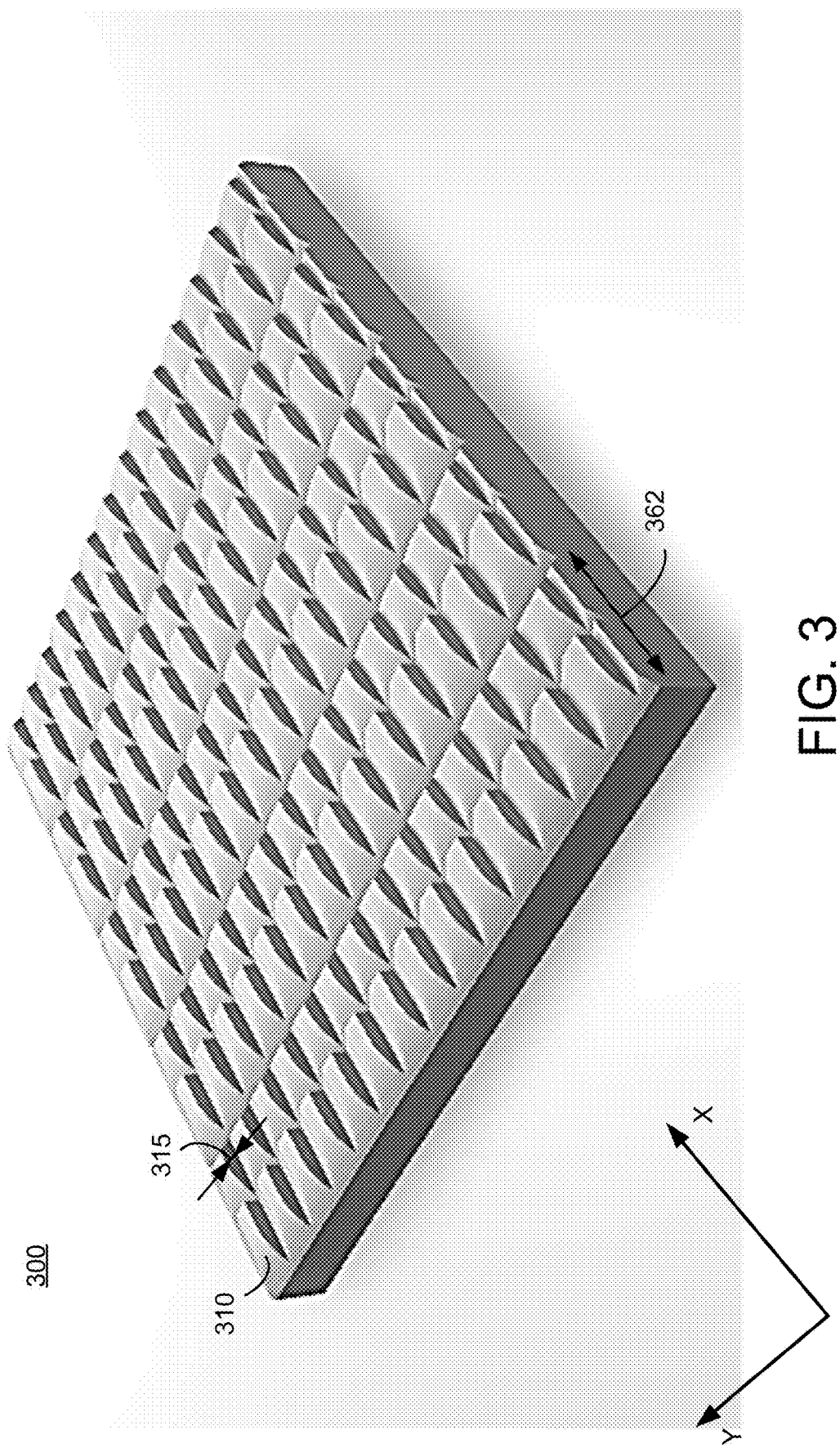
FIG. 3 shows a perspective view of an example tactile interface in accordance with various implementations.

FIG. 3 shows a perspective view of an example tactile interface 300 in accordance with various implementations. The tactile interface 300 may be part of any tactile interface 120 of FIG. 1. In one example, the tactile interface 300 includes a plurality of bumps 310. Each bump 310 has a fin shape, and is composed of the same or different materials than the substrate (e.g., substrate 112). In one aspect, a shape of leading edge of a bump 310 is different than a shape of a trailing edge of the bump 310. Tactile interface 300 may be formed, for example, by painting, printing, inscribing, calandering, molding or etching a surface of a substrate. When a force or contact is applied to the bumps 310, the bumps 310 may vibrate (e.g., acoustic vibrations and/or mechanical vibrations). In some embodiments, the bumps 310 are disposed in an array form. In one aspect, the tactile interface 300 is configured to vibrate at a particular frequency according to a direction of a force or contact applied. For example, the tactile interface 300 vibrates at a higher frequency when a swipe contact is applied in a Y direction compared to when a swipe contact having approximately the same speed is applied in an X direction. Similarly, the tactile interface 300 can vibrate at different frequencies when a swipe contact is applied in a direction opposite to the Y direction or the X direction. By changing a pitch 315 (e.g., a distance between adjacent bumps), periodicity 362 (e.g., a distance of a group of a one or more bumps 310 periodically appearing), a dimension or a shape of the bumps, frequency of vibrations generated by the tactile interface 300 can be adjusted. In one example, roughness of the tactile interface 300 depends on the pitch 315. For example, a wider pitch 315 increases roughness, and a narrower pitch 315 decreases roughness.

Figure 4:
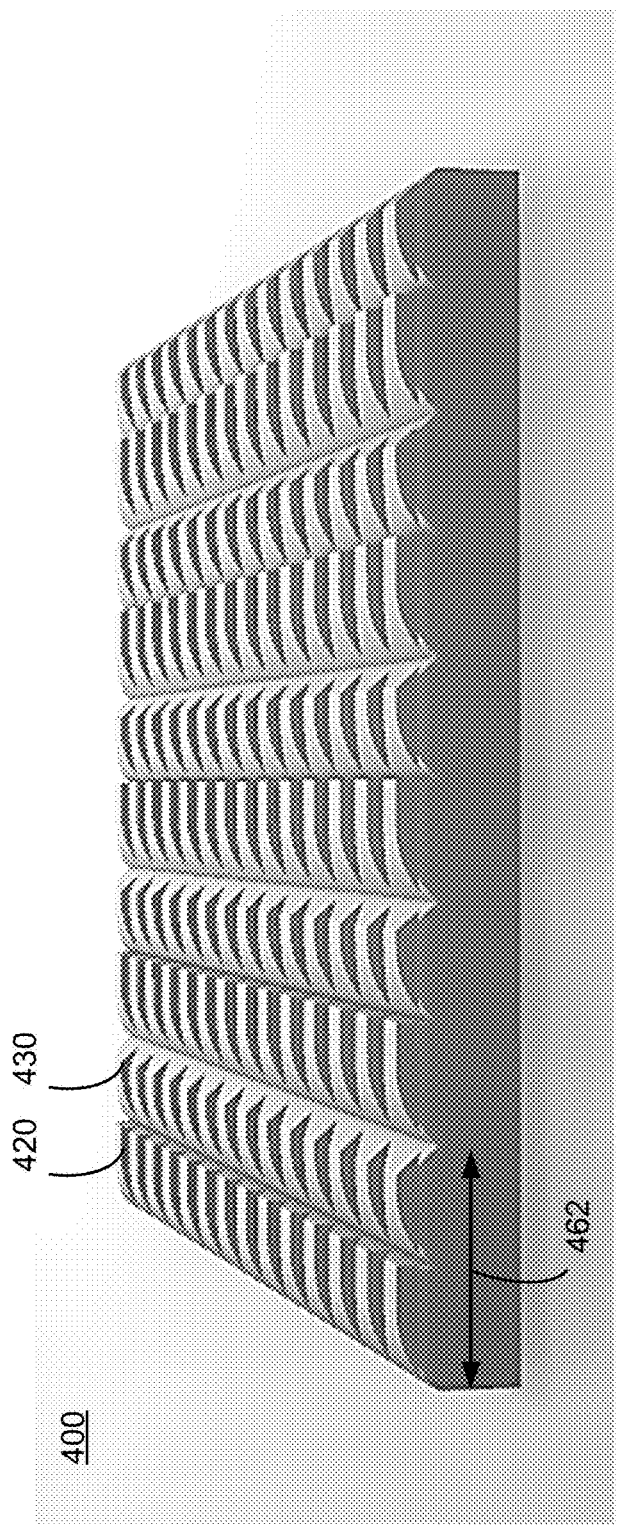
FIG. 4 shows a perspective view of an example tactile interface in accordance with various implementations.

FIG. 4 shows a perspective view of another example tactile interface 400 in accordance with various implementations. The tactile interface 400 may be part of any tactile interface 120 of FIG. 1. The tactile interface 400 includes a first set of bumps 420 and a second set of bumps 430. In one aspect, a shape of a bump 420 and a shape of a bump 430 may be different. The bumps 420, 430 may be disposed in an alternating sequence to have periodicity 462. Accordingly, when a tactile contact is applied on the tactile interface 400, the tactile interface 400 may generate vibrations with various energy signatures. In one example, a first set of bumps 420 arranged in a first direction is configured to generate an energy signature in response to a tactile contact applied in the first direction (e.g. up/down along a single vertical set of bumps 420 or 430) and a second set of bumps 430 arranged in a second direction is configured to generate a second different energy signature in response to a tactile contact applied in the second direction (e.g. right/left along a single row of alternating bumps 420/430). Hence, a direction of a swipe may be determined according to energy signature from a single tactile interface 400 in one embodiment. In other embodiments, the tactile interface 400 includes additional set of bumps or the bumps are arranged in different arrangements (e.g., directions) than shown in FIG. 4.

Figure 5:
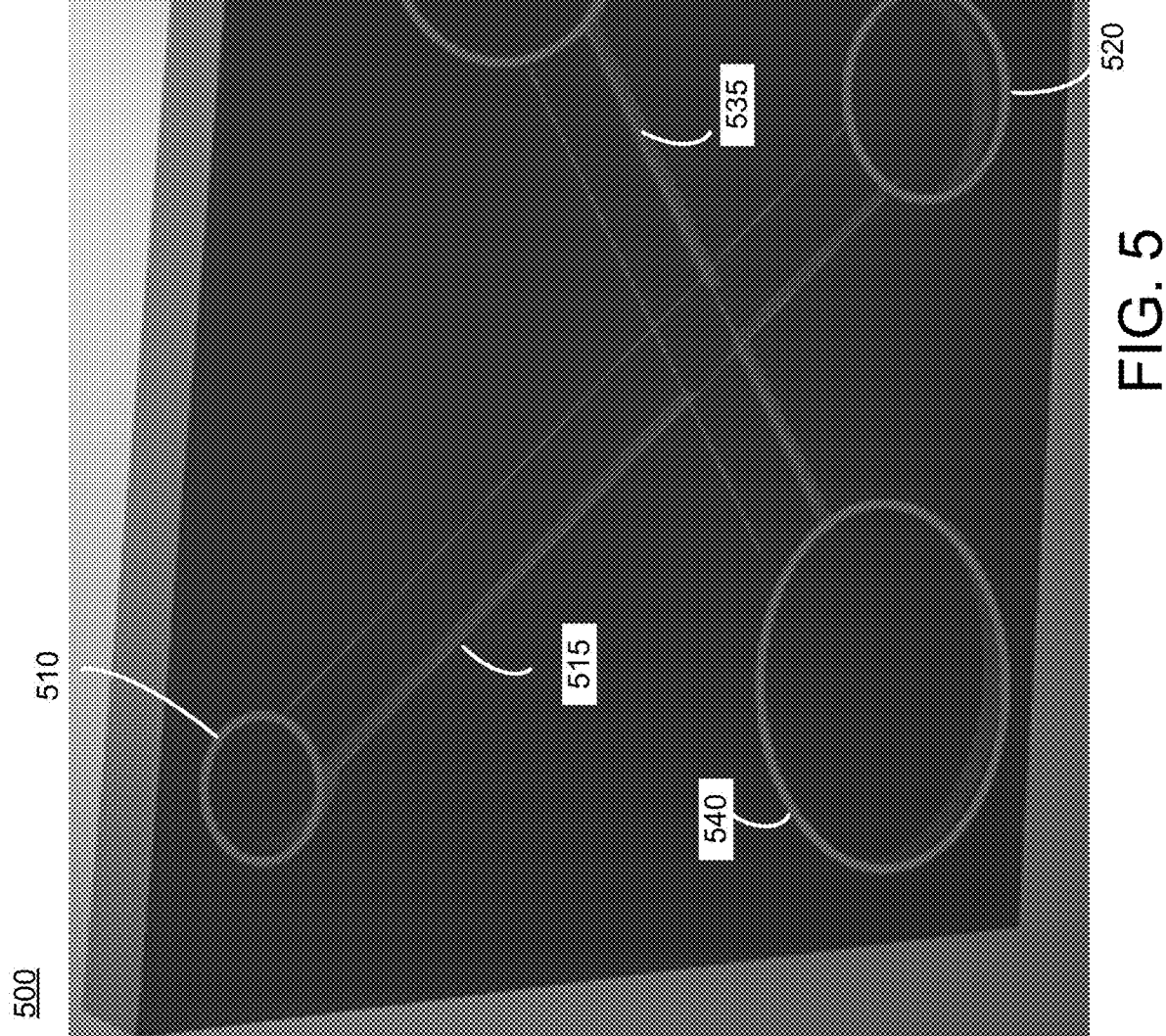
FIG. 5 shows a perspective view of an example tactile interface in accordance with various implementations.

FIG. 5 shows a perspective view of another example tactile interface 500 in accordance with various implementations. The tactile interface 500 may be part of any tactile interface 120 of FIG. 1. In one embodiment, the tactile interface 500 includes resonators 510, 520, 530, 540. Each of the resonators 510, 520, 530, 540 may have a circular shape, a cylindrical shape, or a hemisphere shape. The acoustical resonators 510, 520, 530, 540 may be formed, for example, by painting, printing, inscribing, molding, lighting or etching a surface of a substrate then covering with a circuit board or another component. The combination of tubes and cavities create acoustical resonances that can be detected in the energy signature. Half wave and quarter wave resonators can also be built using just channels formed with these processes. In some embodiments, the tactile interface 500 is formed or disposed on a front surface or a back surface of a substrate (e.g., substrate 112). When a force or contact is directly or indirectly applied to a resonator, the resonator may vibrate. In one configuration, the resonators 510, 520 are coupled to each other through a passage 515, and the resonators 530, 540 are coupled to each other through a passage 535. Each passage may be formed, for example, by painting, printing, inscribing, molding, lighting or etching a surface of a substrate. Each passage may have a quarter wave length of its associated vibration frequency to propagate the vibration. Through a passage, vibration at one resonator may propagate to another resonator. In one aspect, a frequency of a vibration generated by a resonator is determined by a radius of the resonator. The resonators 510, 520, 530, 540 may have the same radius or different radiuses.

Figure 6:
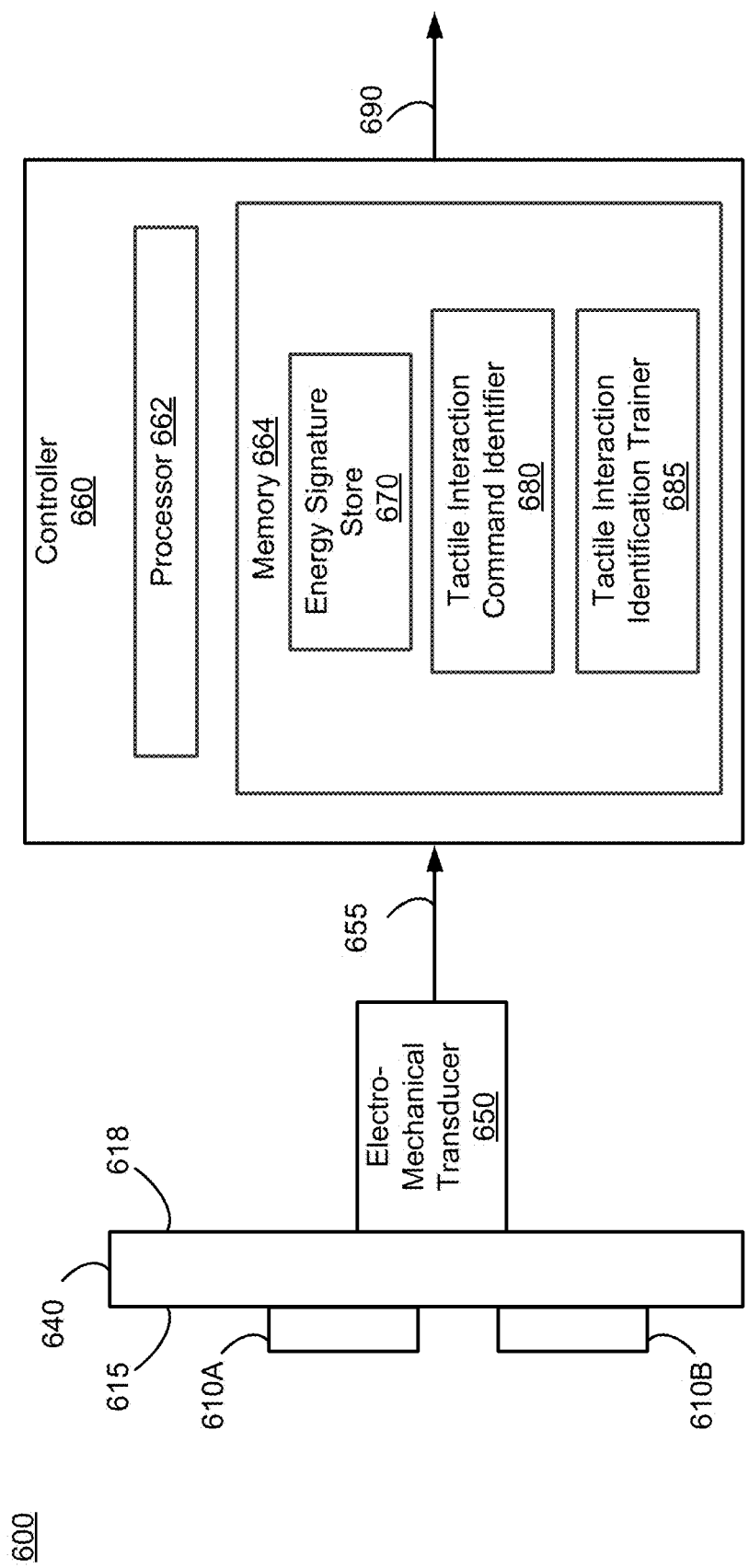
FIG. 6 shows an example apparatus for sensing a tactile interaction with an electro-mechanical transducer and a controller in accordance with various implementations.

FIG. 6 shows an example apparatus 600 for sensing a tactile interaction with an electro-mechanical transducer 650 and a controller 660 in accordance with various implementations. The apparatus 600 may be part of the apparatus 100 of FIG. 1. In the example shown in FIG. 6, the apparatus 600 includes tactile interfaces 610A, 610B, a panel 640, an electro-mechanical transducer 650, and a controller 660. These components operate together to detect a tactile interaction (e.g., swipe) applied on the apparatus 600 by detecting energy signature of tactile interfaces 610A, 610B due to the tactile interaction. In other embodiments, the apparatus 600 includes more, fewer, or different components than shown in FIG. 6. For example, the apparatus 600 includes more tactile interfaces 610 and electro-mechanical transducers 650 than shown in FIG. 6. In other embodiments, the components of the apparatus 600 are arranged in a different manner than shown in FIG. 6.

The panel 640 is a component that provides support to components of the apparatus 600. The panel 640 may be a printed circuit board (PCB) or a semiconductor substrate. The tactile interface 610 is an area of the panel 640 that generates vibrations according to a tactile interaction (e.g., contact or swipe gesture). Each tactile interface 610 includes surface variations forming a tactile pattern that, in response to the tactile interaction by a finger, a stylus pen, or hand of a user, vibrates according to the tactile interaction. Vibrations may be acoustic vibrations traveling through air and/or mechanical vibrations traveling through a physical object (e.g., panel 640). Different tactile interfaces 610 may have different patterns that generate energy signatures based on tactile interactions therewith include signatures around different frequencies, or different time periods between vibrations in response to a direction of the tactile interaction. The tactile interface 610 may be formed by depositing, painting, printing, inscribing, molding or etching a surface 615 of the panel 640. In one embodiment, the tactile interfaces 610 protrude from the surface 615 of the panel 640. In other embodiments, the tactile interfaces 610 are indented from the surface 615.

The electro-mechanical transducer 650 is a component that detects an energy signature or a vibration (an acoustic vibration, a mechanical vibration or both) from a tactile interface 610 due to the tactile interaction with the tactile interface 610. The electro-mechanical transducer 650 may be implemented as the electro-mechanical transducer 150 described above with respect to FIG. 1. Thus, duplicated description thereof is omitted herein for the sake of brevity. In one embodiment, the electro-mechanical transducer 650 is coupled to a rear surface 618 of the panel 640 facing away from the tactile interfaces 610A, 610B. Alternatively, the electro-mechanical transducer 650 may be located on the front surface 615 adjacent to the tactile interfaces 610A, 610B.

The electro-mechanical transducer 650 generates an electrical output signal 655 electrically representing characteristics of the detected energy signature or vibration. The electrical output signal 655 may indicate an amplitude or pitch of a detected frequency, a frequency band (or frequency bin) of the detected vibration, and a timing information (e.g., start time, duration, etc.) of the detected vibration. In one embodiment, the electro-mechanical transducer 650 detects vibrations from the tactile interfaces 610A, 610B, and generates the electrical output signal in response to the energy of the detected vibrations. In one or more embodiments, the electro-mechanical transducer 650 may output the electrical output signal 655 represented in an analog format or a digital format. For example, the electro-mechanical transducer 650 generates a voltage or current that corresponds to an amount of energy of vibration in a particular frequency band (e.g., 100 Hz of bandwidth). For another example, the electro-mechanical transducer 650 generates the electrical output signal 655 in the pulse density modulated (PDM) data or pulse width modulated (PWM) data having a pulse density or a pulse width according to an amount of energy in a particular frequency band (e.g., 100 Hz of bandwidth). The electro-mechanical transducer 650 provides the electrical output signal 655 to the controller 660.

The controller 660 is a component that receives the electrical output signal 655 from the electro-mechanical transducer 650, and generates a control signal 690 according to the electrical output signal 655. In one configuration, the controller 660 is electrically coupled to the electro-mechanical transducer 650 through conductive wires or traces. The controller 660 may be disposed on the panel 640 or other components. In some embodiments, the controller 660 is implemented as a field programmable gate array (FPGA) or an application-specific integrated circuit (ASIC). In some embodiments, the controller 660 includes at least one processor 662 and at least one memory 664. The memory 664 can include a non-transitory computer readable medium such as RAM, ROM, EPROM, EEPROM, MROM, or Flash memory devices. The processor 662 can be configured to execute instructions stored in the memory 664 to perform one or more operations described herein. The memory 664 can store one or more applications, services, routines, servers, daemons, or other executable logics for detecting energy signature from the electrical output signal 655 and generating the control signal 690 according to the detected energy signature. The applications, services, routines, servers, daemons, or other executable logics stored in the memory 664 can include any of energy signature store 670, a tactile interaction command identifier 680, and a tactile interaction identification trainer 685.

The energy signature store 670 is a component that stores a mapping between different energy signatures and associated commands or instructions. The mapping between different energy signatures and associated commands may be predefined or reconfigurable. In one approach, the mapping indicates an association between characteristics of an energy signature and a corresponding command. Examples of the characteristics of the energy signature includes frequency ranges or spectral content of vibrations detected, time periods between vibrations detected, pitches of the vibrations, a rate of a change in frequency bands of vibrations, a rate of change in time periods between vibrations detected, a rate of change in pitches of the vibrations, or any combination of them. Examples of instructions or commands include increasing or decreasing a volume of a device (e.g., a microphone, a speaker, etc.), turning on or off the device, etc. For example, the energy signature store 670 stores a mapping information indicating that a vibration with a gradually increasing frequency is associated with an instruction to increase a volume of a microphone. For another example, the energy signature store 670 stores a mapping information indicating that a vibration with a gradually decreasing frequency is associated with an instruction to decrease a volume of a microphone.

The tactile interaction command identifier 680 is a component that receives the electrical output signal 655 from the electro-mechanical transducer 650, and identifies a command or an instruction associated with an energy signature electrically represented by the electrical output signal 655. In one approach, the tactile interaction command identifier 680 obtains, from the electrical output signal 655, characteristics of the energy signature detected by the electro-mechanical transducer 650. For example, in case the electrical output signal 655 is an analog signal indicating a pitch of a vibration, a spectral content of the vibration, a time duration between vibrations detected by the electro-mechanical transducer 650 in a corresponding voltage, current, or a combination of them, the tactile interaction command identifier 680 may extract information about the vibrations detected by the electro-mechanical transducer 650 from the analog signal. For another example, in case the electrical output signal 655 is a digital signal encoding a pitch of a vibration, a spectral content of the vibration, a time duration between vibrations detected by the electro-mechanical transducer 650, for example, by a corresponding pulse width or pulse density, the tactile interaction command identifier 680 may decode the digital signal to obtain information about the vibrations detected by the electro-mechanical transducer 650. Once information about the vibrations is obtained, the tactile interaction command identifier 680 may apply the obtained information to the energy signature store 670, and identify a corresponding command. For example, the tactile interaction command identifier 680 determines that a spectral content of a vibration indicated by the electrical output signal 655 gradually increases in peak frequency, and refers to the mapping stored by the energy signature store 670 to determine that the gradually increasing spectral content of a vibration is associated with an instruction to increase a volume of a microphone. The tactile interaction command identifier 680 may execute the determined instruction. In some embodiments, the tactile interaction command identifier 680 generates a control signal 690 indicating the determined instruction, and provides the control signal 690 to another processing device, by which the instruction can be executed according to the control signal 690.

The tactile interaction identification trainer 685 is a component that assists determining tactile interaction. In some embodiments, the tactile interaction identification trainer 685 is implemented as a machine learning application that trains neural networks to adapt to particular ranges of characteristics of energy signature detected. In one approach, the tactile interaction identification trainer 685 retrieves characteristics of the energy signature from the energy signature store 670, and adjusts the ranges of the characteristics of the energy signature according to the electrical output signal 655. In one aspect, tactile interaction may be subject to change depending on the circumstance. For example, different users have different patterns of tactile interaction, because a speed and an amount of pressure applied may vary for different users. With the updated estimate, the tactile interaction command identifier 680 may improve accuracy or speed of the identification of the tactile interaction for the particular user by the tactile interaction command identifier 680.

Figure 7:
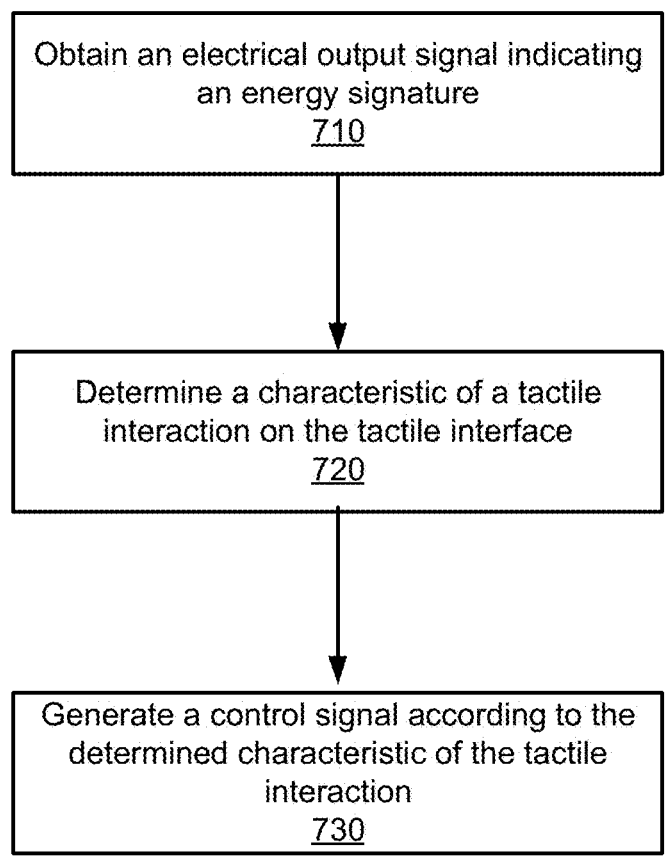
FIG. 7 depicts an example method for detecting tactile interaction based on energy signature of tactile interface due to the tactile interaction in accordance with various embodiments.

FIG. 7 depicts an example method 700 for detecting tactile interaction (e.g., swipe gesture) based on energy signature of tactile interface due to the tactile interaction in accordance with various embodiments. The method 700 may be performed by the controller 660 of FIG. 6. In some embodiments, the method 700 may be performed by other entities. In other embodiments, the method 700 incudes more, fewer, or additional steps than shown in FIG. 7.

The controller 660 obtains an electrical output signal indicating an energy signature (step 710). The energy signature may represent surface variations of a tactile interface. In one aspect, the energy signature indicates a varying pitch of vibrations, a varying spectral content of vibrations, a varying time period between vibrations, or any combination of them. For example, a tactile interface 120 vibrates and has a spectral content where the frequency associated with the peak amplitude is increasing , or where the pitch is increasing, or both according to tactile interaction along a first direction. For example, a tactile interface 120 vibrates with an increasing time period between vibrations at different spatial frequencies according to tactile interaction along a second direction. An electro-mechanical transducer 150 may generate an electrical output signal in an analog format or a digital format, according to the detected vibrations. For example, an electrical output signal indicates a frequency band or set of frequencies of a vibration detected, pitch or amplitude of the vibration detected, and timing information (e.g., start time and/or duration) of the vibration. The controller 660 may receive the electrical output signal from the electro-mechanical transducer 150.

The controller 660 determines characteristics of a tactile interaction on the tactile interface according to the electrical output signal (step 720). The controller 660 may obtain characteristics of the energy signature detected by the electro-mechanical transducer 650 from the electrical output signal. For example, in case the electrical output signal 655 is an analog signal indicating a pitch of a vibration, a frequency of the vibration, a time duration between vibrations detected by the electro-mechanical transducer 650 in a corresponding voltage, current, or a combination of them, the controller 660 may extract information about the vibrations detected by the electro-mechanical transducer 650 from the analog signal. For another example, in case the electrical output signal 655 is a digital signal encoding a pitch of a vibration, a frequency of the vibration, a time duration between vibrations detected by the electro-mechanical transducer 650 by, for example, a corresponding pulse width, the controller 660 may decode the digital signal to obtain information about the vibrations detected by the electro-mechanical transducer 650.

The controller 660 generates a control signal according to the determined characteristic of the tactile interaction (step 730). In one approach, the controller 660 stores a mapping between different energy signatures and associated commands or instructions. The controller 660 may apply the obtained information to the mapping, and identify a corresponding command. The controller 660 may generate a control signal to execute the identified command or instruction. For example, the controller 660 generates a control signal and transmits the control signal to an external device, which executes the instruction according to the control signal. For example, the control signal configures a device (e.g., speaker or microphone) to turn on, turn off, increase or decrease volume, etc., based on the direction and/or speed of the swipe gesture detected.

Figure 8A:
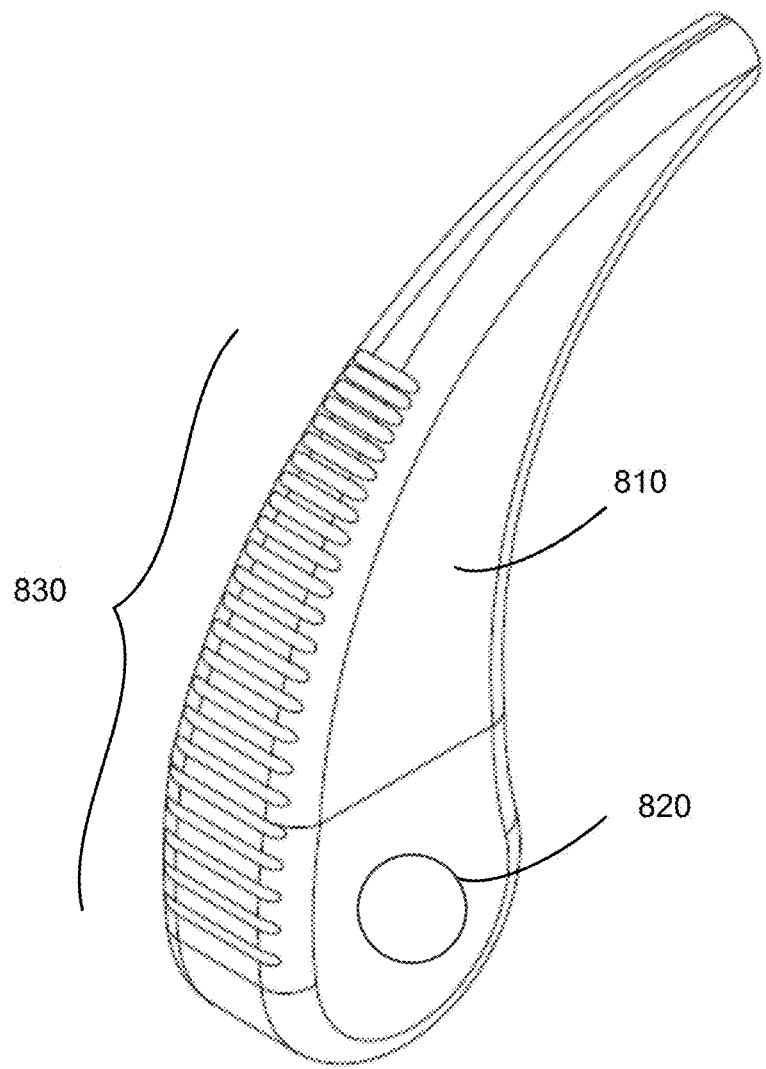
FIG. 8A depicts a perspective view of an example electronic device including tactile interfaces in accordance with various embodiments.
Figure 8B:
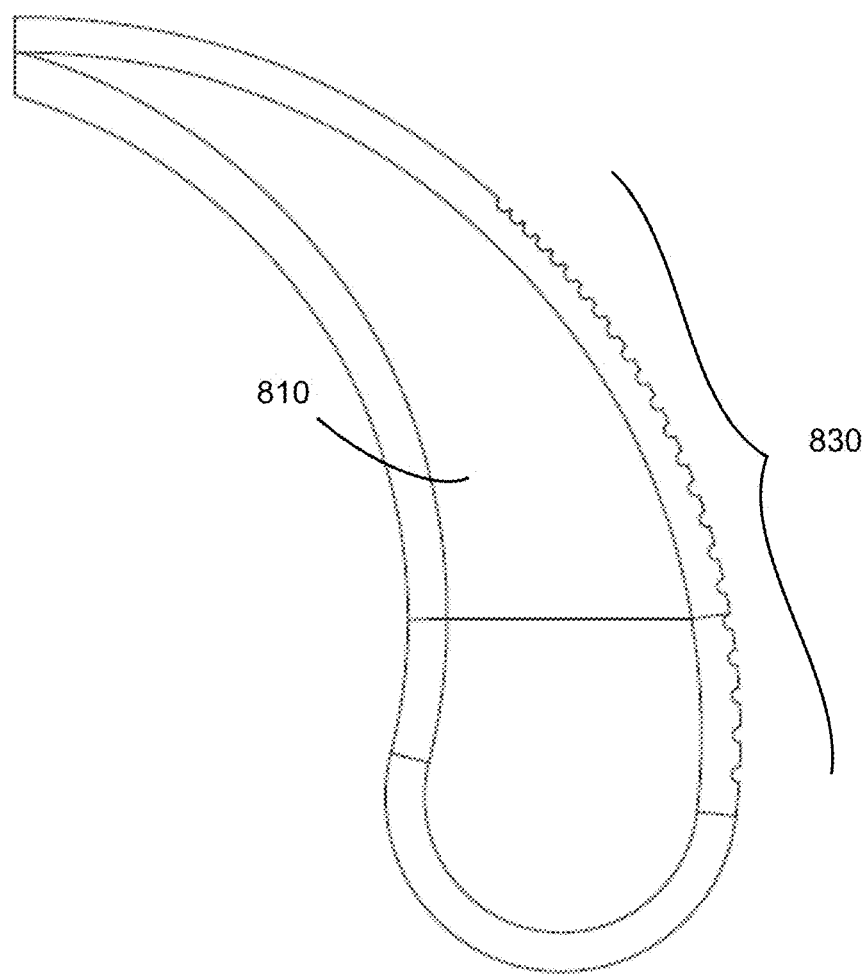
FIG. 8B depicts a side view of the example electronic device of FIG. 8A in accordance with various embodiments.
Figure 8C:
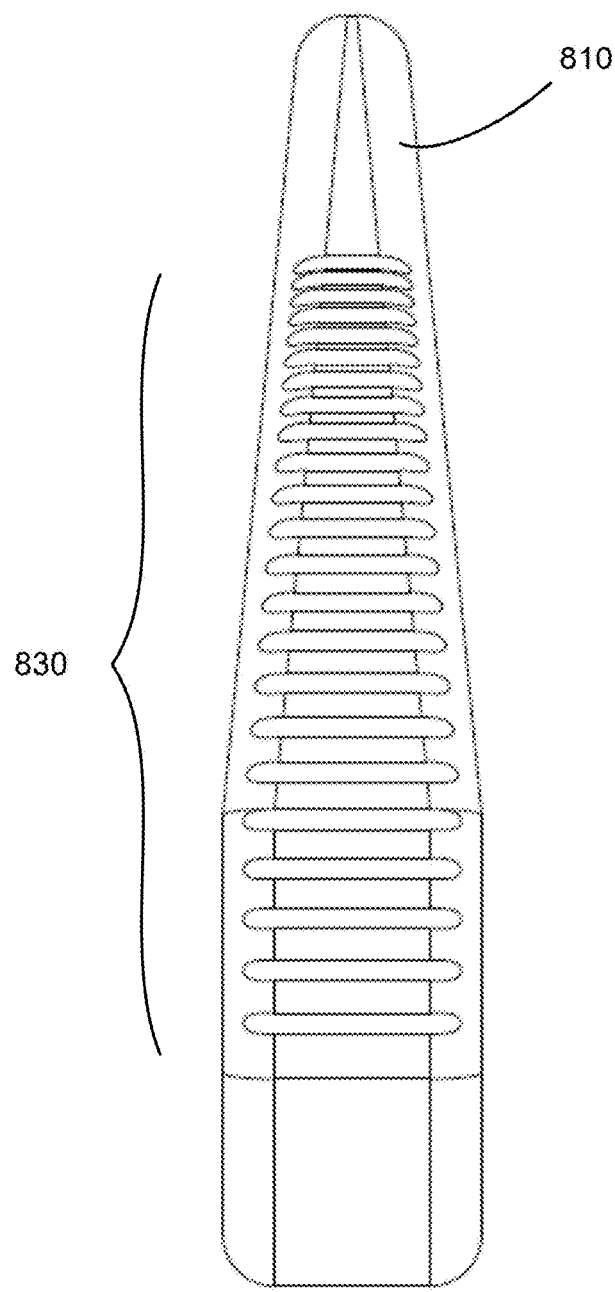
FIG. 8C depicts a front view of the example electronic device of FIG. 8A in accordance with various embodiments.

FIG. 8A depicts a perspective view of an example electronic device 800 including tactile interfaces in accordance with various embodiments. FIG. 8B depicts a side view of the example electronic device 800 of FIG. 8A in accordance with various embodiments. FIG. 8C depicts a front view of the example electronic device 800 of FIG. 8A in accordance with various embodiments. The electronic device 800 may be a hearing aid device.

In some embodiments, the electronic device 800 may include a body 810, an earpiece 820, and one or more tactile interfaces 830. The body 810 is a mechanical component composed of a rigid material (e.g., plastic, metal, etc.). The body 810 may surround or enclose electronic components (e.g., a speaker, electro-mechanical transducer 650 and controller 660 of FIG. 6). The earpiece 820 may protrude from an inner surface of the body 810, and may be structured to fit an outer opening of an ear. Through the earpiece 820, sound from the speaker disposed within the electronic device 820 can be projected to the ear. The tactile interfaces 830 may be disposed on a side of the body 810. In some embodiments, the tactile interfaces 830 are any tactile interfaces described above with respect to FIGS. 1 through 4. In one aspect, tactile interaction (e.g., swipe contact) on tactile patterns of the tactile interfaces 830 generates an energy signature according to the tactile interaction as described above with respect to FIGS. 1 through 7. An electro-mechanical transducer 650 disposed within the body 810 may detect the energy signature, and generate an electrical output signal indicating the detected energy signature, for example, according to spectral content, pitch, a sequence or timing of change in spectral content of vibrations generated by the tactile interaction. A controller 660 disposed within the body 810 may receive the electrical output signal, and determine a characteristic (e.g., direction, speed, etc.) of a tactile interaction on the tactile interface according to the electrical output signal. The controller 660 may generate a control signal or execute instructions corresponding to the determined characteristic of the tactile interaction. For example, the controller 660 may increase or decrease a volume of an output of the speaker, according to a direction of the tactile interaction (e.g., swipe) on the tactile interfaces 830.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A touch sensitive device comprising:
   a tactile interface having non-electrically generated physical surface variations forming a spatially changing tactile pattern, wherein moving tactile interaction with the tactile pattern produces a changing energy signature including mechanical or acoustic vibrations caused by the spatially changing tactile pattern; and
   an electro-mechanical transducer configured to generate an electrical output signal in response to detecting the energy signature that includes mechanical vibrations or acoustic vibrations, an output of the electro-mechanical transducer connectable to a processor configured to produce a control signal based on the electrical output signal of the electro-mechanical transducer.

2. The touch sensitive device of claim 1, wherein the surface variations are variations in roughness.

3. The touch sensitive device of claim 2, wherein the roughness varies across the tactile interface.

4. The touch sensitive device of claim 1, wherein the tactile pattern is characterized by changes in the surface variations.

5. The touch sensitive device of claim 1, wherein the energy signature includes an increase or decrease in pitch or spectral content of the mechanical or acoustic vibrations.

6. The touch sensitive device of claim 1,
   wherein the tactile interface includes first surface variations forming a first tactile pattern and second surface variations forming a second tactile pattern, wherein the first tactile pattern produces a first energy signature in response to tactile interaction in a first direction and the second tactile pattern produces a second energy signature in response to tactile interaction in a second direction, the second direction different than the first direction, and
   wherein the electro-mechanical transducer is configured to generate a first electrical output signal in response to detecting the first energy signature and to generate a second electrical output signal in response to detecting the second energy signature, the output of the electro-mechanical transducer connectable to the processor configured to produce a first control signal based on the first electrical output signal and to produce a second control signal based on the second electrical output signal.

7. The touch sensitive device claim 6, wherein the tactile pattern includes an N by M array of discrete elements, where M<N, the first tactile pattern is formed by M elements of the array and the second tactile pattern is formed by N elements of the array.

8. The touch sensitive device of claim 7, wherein the discrete elements are defined by boundaries between areas of different roughness.

9. The touch sensitive device of claim 7, wherein the discrete elements are defined by boundaries between areas of different height substantially normal to the array.

10. The touch sensitive device claim 1,
    wherein the tactile pattern includes an array of discrete elements formed on the tactile interface, each discrete element has a first edge and a second edge, wherein a first tactile pattern is formed by the first edges of the discrete elements and a second tactile pattern is formed by the second edges of the discrete elements, wherein the first tactile pattern produces a first energy signature in response to tactile interaction in a first direction and the second tactile pattern produces a second energy signature in response to tactile interaction in a second direction, the second direction different than the first direction, and
    wherein the electro-mechanical transducer is configured to generate a first electrical output signal in response to detecting the first energy signature and to generate a second electrical output signal in response to detecting the second energy signature, the output of the electro-mechanical transducer connectable to the processor configured to produce a first control signal based on the first electrical output signal and to produce a second control signal based on the second electrical output signal.

11. The touch sensitive device claim 10, wherein the surface including the tactile interface is nonplanar.

12. The touch sensitive device of claim 1, wherein the tactile interface is integrated with a housing and the electro-mechanical transducer is coupled to the housing.

13. The touch sensitive device of claim 1 in combination with the processor is configured to produce the control signal based on the electrical output signal of the electro-mechanical transducer.

14. The touch sensitive device of claim 1, wherein the surface including the tactile interface is molded plastic.

15. The touch sensitive device of claim 1, wherein the surface including the tactile interface is fabricated metal.

16. The touch sensitive device of claim 1, wherein the touch sensitive device is integrated in a housing of a hearable device including a sound-producing electro-acoustic transducer that emits sound from an ear-contact portion of the hearable device.

17. The touch sensitive device of claim 1, wherein the touch sensitive device is integrated in a housing or display interface of a portable electronic device.

18. The touch sensitive device of claim 1, wherein the touch sensitive device is integrated in a durable goods appliance.

19. The touch sensitive device of claim 1, wherein the touch sensitive device is integrated in an automobile.

20. The touch sensitive device of claim 1 wherein tactile interaction is detected despite variations in speed or force applied during tactile interaction.

21. A controller comprising:
    a processor; and
    a non-transitory computer readable medium storing instructions, when executed by the processor, cause the processor to:
        obtain an electrical output signal indicating an energy signature, the energy signature representative of non-electrically generated physical surface variations of a tactile interface wherein the physical surface variations form a spatially changing tactile pattern, and
    determine a characteristic of a moving tactile interaction on the tactile interface according to the electrical output signal, wherein the tactile interaction with the tactile pattern produces a changing energy signature including mechanical or acoustic vibrations caused by the spatially changing tactile pattern.

22. The controller of claim 21, wherein the energy signature indicates a change in spectral components according to a direction of the tactile interaction.

23. The controller of claim 21, wherein the energy signature includes an increase or decrease in pitch or spectral content of the mechanical or acoustic vibrations.

24. The controller of claim 21 wherein the processor is operative to detect tactile interaction despite variations in speed or force applied during tactile interaction.

* * * * *